United States Patent [19]

Brundidge

[11] 4,365,285

[45] Dec. 21, 1982

[54] VEHICULAR SEAT BELT APPARATUS (LITE-A-BELT)

[76] Inventor: Larry G. Brundidge, 481 45th Pl., NE., Salem, Oreg. 97301

[21] Appl. No.: 245,825

[22] Filed: Mar. 20, 1981

[51] Int. Cl.³ .................... B60R 21/10; F21V 33/00; F21L 15/20
[52] U.S. Cl. ........................................ 362/32; 362/75; 362/108; 362/191; 362/200; 362/208; 362/295; 280/801
[58] Field of Search ............... 362/32, 108, 75, 191, 362/200, 208, 295; 280/801

[56] References Cited

U.S. PATENT DOCUMENTS

| | | | |
|---|---|---|---|
| 2,854,563 | 9/1958 | Catching | 362/802 |
| 3,549,878 | 12/1970 | Bailey | 362/806 |
| 3,840,853 | 10/1974 | Cukale | 362/802 |
| 4,009,381 | 2/1977 | Schreiber et al. | 362/32 |
| 4,112,482 | 9/1978 | Powell | 362/196 |
| 4,186,425 | 1/1980 | Nadimi | 362/32 |

Primary Examiner—Irwin Gluck
Attorney, Agent, or Firm—Edwin E. Greigg

[57] ABSTRACT

Illuminated vehicular seat belt having an illuminated clip structure attachable to a seat belt near or proximate to the buckle having the purpose to facilitate easy location at night or in unlighted parking garages the end or ends of a seat belt; including a fiber optic cord or pipe extending from a light source to a display portion of said buckle for receiving light from said fiber optic pipe.

6 Claims, 4 Drawing Figures

U.S. Patent   Dec. 21, 1982   4,365,285
FIG. 1
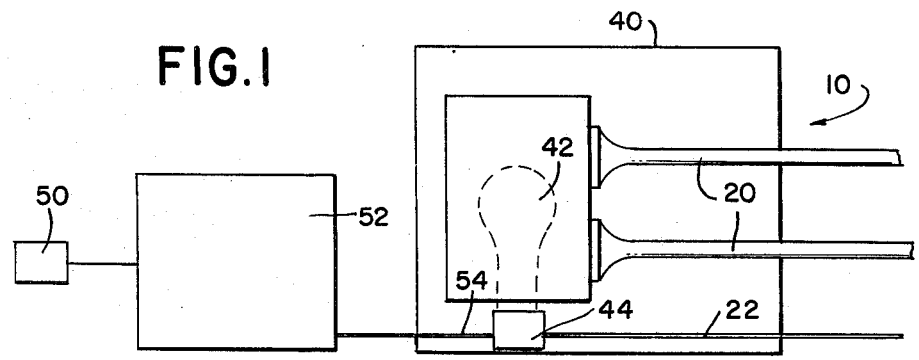
FIG. 2
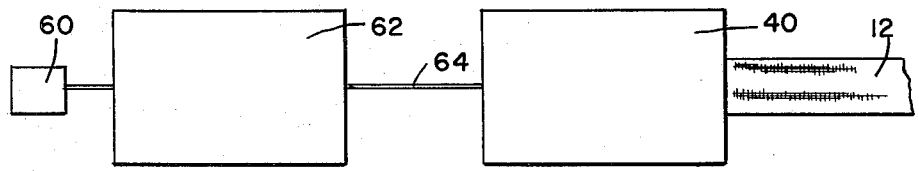
FIG. 3
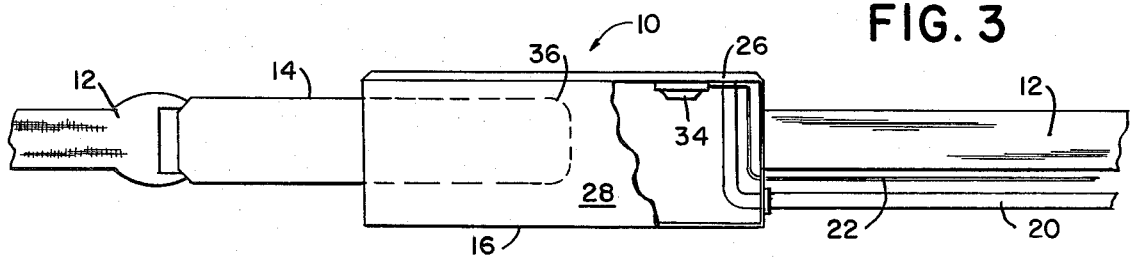
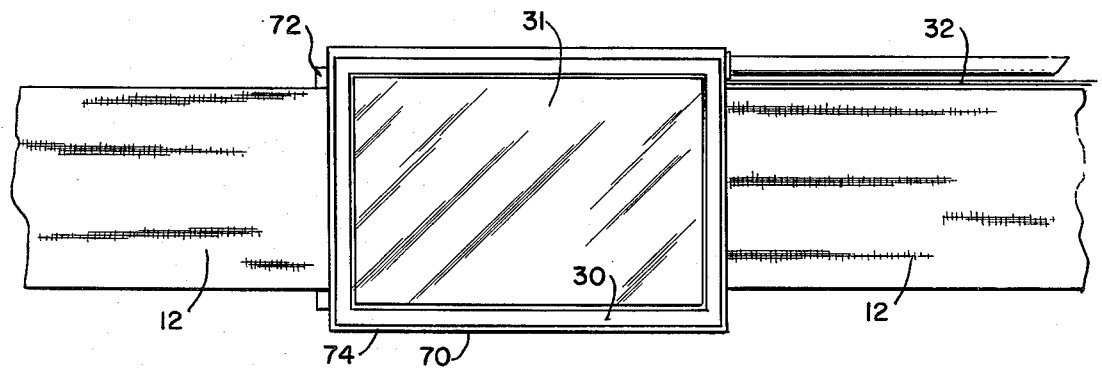
FIG. 4

VEHICULAR SEAT BELT APPARATUS (LITE-A-BELT)

CROSS-REFERENCES TO RELATED PRIOR ART REFERENCES & DISCLOSURES

The vehicular seat belt apparatus is an improvement and departure from prior art concepts found shown in the following:
U.S. Pat. No. 2,854,563
U.S. Pat. No. 3,549,878
U.S. Pat. No. 4,009,381
U.S. Pat. No. 4,186,425

BRIEF SUMMARY OF THE INVENTION

The invention relates to an improved vehicular seat belt apparatus, and more particularly the invention is related to and directed to a selectively illuminated belt terminal or belt buckle arrangement as used on cars and airplanes.

Further, the invention relates to a lighted belt buckle arrangement having an element comprising an illuminated clip which attaches to the seat belt just below the buckle and illuminates the face of the clip so that the end of the pair of seat belt members can easily be located in the vehicle. The face of the buckle may contain the name of the vehicle manufacturer. logo or similar design which is the object of the illumination.

Particularly it is seen that a purpose of the invention is to facilitate easy location at night or in darkened garages and when one is entering the vehicle so that ends of the seat belt members can easily be found.

It is also within the purveiw of the invention to provide switch elements operable from the vehicle dash panel, the belt buckle, or by a pressure sensitive switch in the seat of the vehicle, each such switch enabling the belt buckle arrangement to be conveniently illuminated for at least a brief period of time.

BACKGROUND OF THE INVENTION

It has long been an objection in the use of vehicles to enter such vehicle, whether an automobile or an airplane, and then to conveniently or easily find the ends of the pair of seat belt members, particularly in the dark or when one is receiving the vehicle from authorized use by others, such as parking lot attendants, other uses of the vehicle and the like.

There has been no comprehensive system for providing ease in finding the belt buckle end members other than by illuminating the entire inside compartment of the vehicle such as by a dash panel light or an overhead light and this is not often a best mode of finding and engaging use of seat belt member elements.

SUMMARY AND OBJECTS OF THE INVENTION

It is a feature, advantage and object of the present invention to provide a lighted belt terminal member using a fiber optic cord apparatus that conveys a light illuminated source from a housing along a fiber optic cord member to a buckle end or terminal member. Further it is an object of the present invention to provide end and a buckle end or terminal means for illuminating the terminal as well as providing an ON/OFF switch so that when the male and female buckle ends are engaged the switch is open circuited and the illumination for the fiber optic cord member is extinguished. It is an object and advantage of the present invention to provide attachment means so that a fiber optic cord and a switch cord structure may each be clipped onto a belt fabric and extend between the ends thereof terminating at a buckle so that illumination is selectively displayed on the buckle in accordance with primary and secondary objects of the present invention.

It is a further and distinctive object of the present invention to provide selective switch element so that a light source for the fiber optic cords may be selectively energized concurrently with either an ignition switch, a timed seat buckle dash light, a pressure sensitive seat switch or a switch disposed in the belt buckle responsive to being open circuited when the male and female buckle ends are appropriately engaged.

BRIEF DESCRIPTION OF THE SEVERAL VIEWS OF THE DRAWINGS

The above and other objects and advantages of the invention will become apparent upon full consideration of the following detailed description and accompanying drawings in which:

FIG. 1 is a schematic illustration of the electrical system and the fiber optic light distribution system according to a preferred embodiment of the present invention;

FIG. 2 is an alternative best mode of the invention;

FIG. 3 is a plan elevation view of a pair of seat belt elements terminating in a male and female buckle end showing a fiber optics terminal and a ON/OFF all disposed in accordance with the preferred and best mode of the invention; and FIG. 4 is an alternative best mode of the invention showing the fiber optic cord member and the switch cord being clipped onto the belt fabric thereof.

DETAILED DESCRIPTION OF THE PREFERRED EMBODIMENT OF THE INVENTION

Referring now to the drawings there is shown an improved vehicular seat belt system and apparatus 10 including a pair of seat belt elements 12, 12 as shown in FIG. 3 terminating at the free end and a male buckle end 14 and a female buckle end 16. The seat belt elements are comprised of regular or conventional belt fabric and at the other end are secured to a frame or base structure of the vehicle (not shown). Along an edge of one of the seat belt elements 12 there is of comparable length a fiber optic cord element 20 and a comparable length of switch cord 22 and shown as terminating within the female buckle end 16 in a fiber optic terminal 26 from which light is disposed onto a fiber optic display 28 or 30 as shown in FIG. 4.

The fiber optic cord 20 and the switch code 22 may be conveniently associated and coupled to the belt fabric 12 including being secured thereto by clip elements 32, 32 as shown in FIG. 4. The switch cord 22 terminates in an ON/OFF switch 34 and the switch 34 is normally closed until it engages with the male buckle end 14 having its end 36 engaging the switch 34 so that it is depressed into an open circuit condition.

The other end of the fiber optic cord is shown originating in a container or source frame or box 40 within which is a light bulb or a light source 42 connected in a socket 44 coupled to a vehicle power source (not shown) coupled to an ignition circuit 50, a timed seat belt dash light 52 of conventional construction found on many vehicles and which is a light on the dash indicating that seat belts ought to be coupled and after a timed period the light goes out. The source is coupled to conductors 54 to the socket 44 and sent to the switch cord 22 that extends along the belt fabric as described above and shown in FIG. 3.

And an alternative arrangement also within the purview of the invention, FIG. 2 shows an ignition switch 60 coupled to a pressure sensitive seat switch 62 and sends through a conductor 64 comparable to conductor 54 of FIG. 1 to a light box 40 and sends into an associated relation to the belt 12 as described above.

FIG. 4 shows a different fiber optic display that comprehends the entire front surface of the buckle 70 to which is coupled its male buckle end 72 to the female buckle end 74 as shown. The buckle release button is constructed of translucent material to allow for illumination of the buckle face and of the button itself.

It is therefor seen that the buckle and light source will be turned off when the male and female terminals are buckled together, so that it may compress a switch into an open circuit condition as described above with reference to FIG. 3. Another alternative is for the buckle units to be of clip on types so that they clip onto the belt buckle ends 14, 16 of FIG. 2 and a system operates in accordance with the electric timer activated when the vehicle door is opened such as described in connection with the seat belt dash light 52 described above such that the timer (not shown) allows electric current to flow to the light source 40 for up to several minutes and then turns the current off automatically. Another concept is for the device to be activated by a pressure sensitive seat switch illustrated in FIG. 3 so that the light box 40 is on for a period of several minutes such as up to 5 minutes before shutting off automatically and being reset as described above. In another application it is comprehended that the light source is coupled directly to an ignition switch such as may be in the purview of FIGS. 1 and 2 so that when the vehicle has its power turned on the buckle system of the invention is turned on and the concepts and advantages of the invention are realized. By direct wiring the light remains on while the vehicle is in use as long as the ignition is turned on.

Additional embodiments of the invention in this specification will occur to others and therefor it is intended that the scope of the invention be limited only by the appended claims and not by the embodiments described hereinabove. Accordingly, reference should be made to the following claims in determining the full scope of the invention.

I claim:

1. Improved vehicular seat belts comprising
   a pair of seat belt elements forming a safety seat belt apparatus for a vehicle,
   a light source means selectively energized to emit light,
   a fiber optic cord means disposed along a length of at least one of said seat belt elements and receiving emitted light from said light source and displaying said light onto terminal or buckle members of said seat belt elements, and
   switch means for selectively energizing said light source.

2. The invention of claim 1 wherein said switch means is connected to ignition means of said vehicle.

3. The invention of claim 1 wherein said switch means is a timed seat belt dash light connected in parallel to said light source.

4. The invention of claim 1 wherein said switch means is a pressure sensitive seat switch of said vehicle for energizing said light source.

5. The invention of claim 1 wherein an ON/OFF switch in a buckle member energizes a light source circuit when said buckle members are interconnected and de-energized said circuit when said buckle members are disengaged.

6. The invention of claim 1 wherein said fiber optic cord means is flexible and mounted in parallel relation to at least one of said seat belt elements.

* * * * *